Nov. 3, 1970  J. MEDNEY  3,537,937
METHOD AND APPARATUS FOR FILAMENT WINDING PLANAR STRUCTURES
Filed Dec. 15, 1966
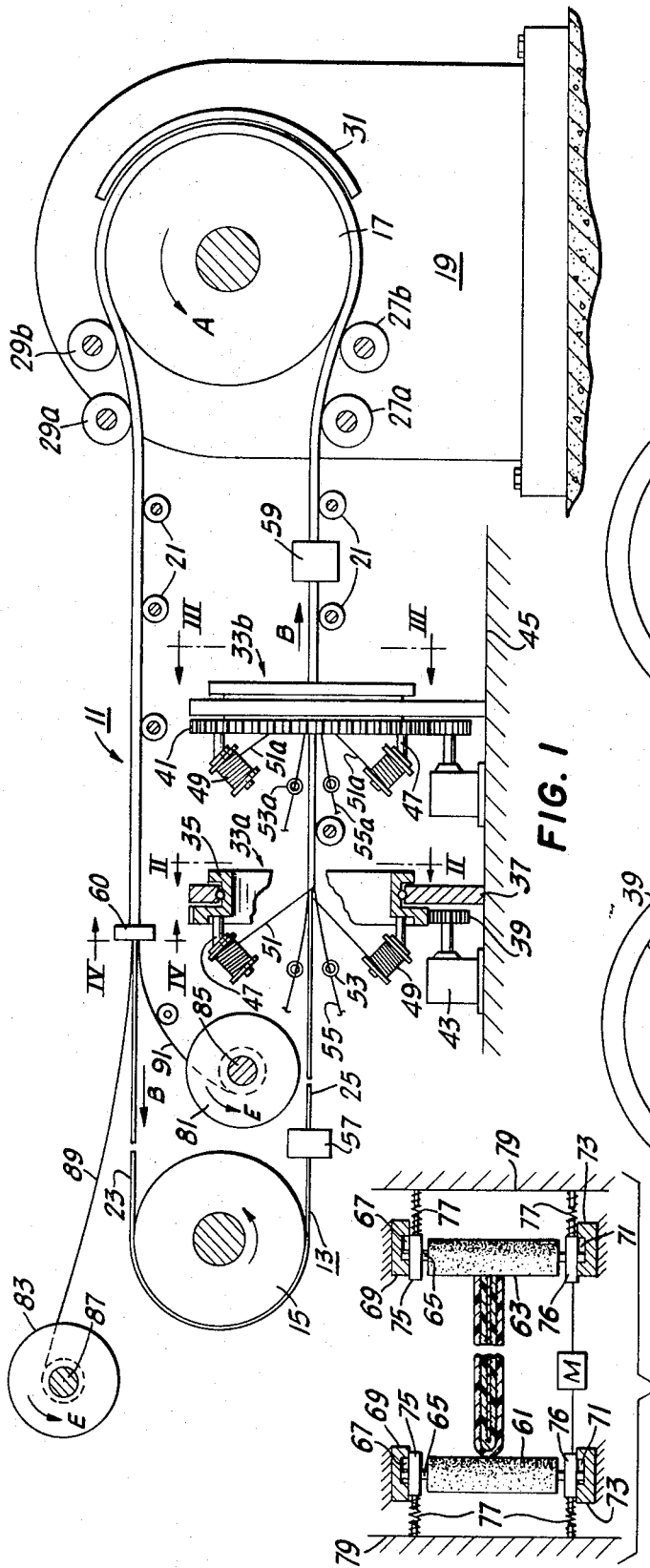
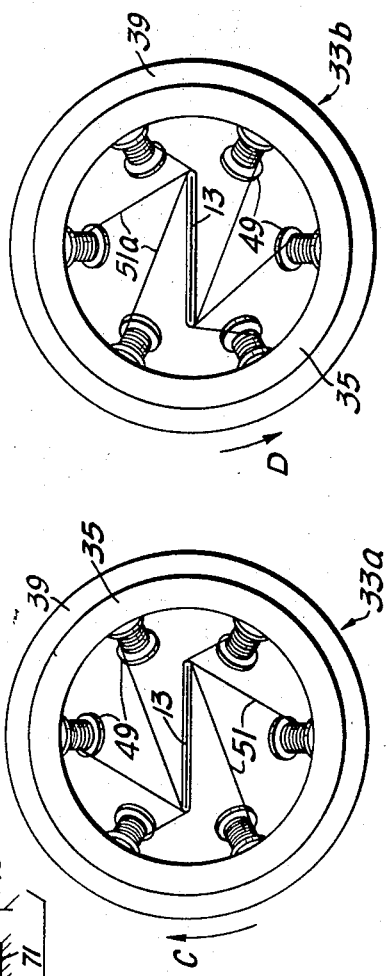
INVENTOR.
JONAS MEDNEY
BY Shennault H Barber
his Attorney United States Patent Office 3,537,937
Patented Nov. 3, 1970

3,537,937
METHOD AND APPARATUS FOR FILAMENT
WINDING PLANAR STRUCTURES
Jonas Medney, Oceanside, N.Y., assignor to Koppers
Company, Inc., a corporation of Delaware
Filed Dec. 15, 1966, Ser. No. 602,051
Int. Cl. B65h 81/00
U.S. Cl. 156—426
3 Claims

ABSTRACT OF THE DISCLOSURE

Longitudinally arranged filaments are applied to opposite surfaces of an endless flat metallic band and other filamentary rovings are helically wound thereover. The filamentary structure is resin impregnated just before the band and structure pass through a resin curing apparatus wherein the resin is partially cured. Upon emerging from the curing apparatus, the resin and filamentary material along the edges of the band is removed and separate top and bottom filament wound resin sheets of continuous length are removed from the band and wound on spools.

BACKGROUND OF THE INVENTION

This invention relates to reinforced plastics and, more particularly, to method and apparatus for filament winding planar structures in the form of a continuous strip.

The continuous production of reinforced plastic planar members in the form of strip and sheets, as well as panels, has, heretofore, been accomplished by several methods which make use of cut fibers and a resin binder. Such sheets and panels have low strength characteristics mainly because of the lack of fiber continuity. The fibers in the resin sheet or panel are relatively short and are heterogeneously arranged in the resin, wherefore fiber strength is not attainable.

SUMMARY OF THE INVENTION

The invention comprises passing an endless thin flat metallic band around spaced apart rollers one of which is powered and applying filaments lengthwise to the top and bottom surfaces of the band. Over the lengthwise extending filaments, other filaments are wound helically and all of the filaments are then resin impregnated just before the band passes through a resin curing apparatus. Upon emerging from the curing apparatus, the cured resin and filament material along the edges of the band is removed, thus producing top and bottom continuous sheets which are separately removed and wound on receiving spools.

In another aspect, the invention comprises an endless thin flat metallic band surrounding spaced apart rollers one of which is powered. Means is provided for applying a parting agent to the band before a plurality of first filaments are applied longitudinally. Second filaments are helically wound over the first filaments and thereafter the filaments are impregnated with a heat curable resin just before the band and filament structure pass through a resin curing apparatus wherein the resin is substantially cured. Upon emerging from the resin curing apparatus the band and structure passes between vertically disposed powered grinding rollers which remove the cured resin and filamentary material from along the edges of the band thus producing a top continuous sheet and a bottom continuous sheet which are separately removed and wound on spools.

BRIEF DESCRIPTION OF DRAWING

FIG. 1 is a schematic longitudinal elevational view of apparatus of the invention that is suitable for carrying out the method of the invention; and FIGS. 2-4 are sectional views along respective lines II—II, III—III and IV—IV of FIG. 1.

DETAILED DESCRIPTION

FIG. 1 illustrates apparatus 11 which includes a continuous endless band 13, preferably made of relatively thin steel, that is carried around an end roller 15 at the left-hand side of FIG. 1 and a curing drum 17 forming part of resin curing apparatus 19 situated at the right-hand side of FIG. 1. The steel band 13 is supported at convenient locations intermediate the end rollers 15, 17 by a plurality of spaced apart idler rollers 21, some of which support the top run 23 and some of which support the bottom run 25.

The curing apparatus 19, known as a Rotocure, is marketed by American Biltrite Rubber Company, Inc., and includes, besides the curing drum 17, a pair of spaced apart guiding-in rollers 27a, 27b, a pair of spaced apart guiding-out rollers 29a, 29b, and a heating element 31 that partially surrounds the steel band 13 on the curing drum 17. The Rotocure apparatus is powered so as to rotate the curing drum 17 in the direction of the arrow A, and the endless band 13 moves in the direction of the arrow B. The endless band 13 is maintained under tension by suitable means known in the art (not shown). While the invention is described herein in association with a curing apparatus known as a Rotocure, it is to be understood that other resin curing apparatus may be found suitable for practicing the method of the invention, and such other suitable apparatus may, of course, be used if preferred.

Intermediate the end roll 15 and the Rotocure apparatus 19, there are at least one and preferably a plurality of rotatable winding mechanisms 33a, 33b which are substantially identical. Alternate winding mechanisms, however, rotate in opposite directions for a purpose explained hereinafter. Each winding mechanism 33a, 33b surrounds a portion of the bottom run 25 and includes a rotatable ring 35 supported on a frame 37 for rotation about a horizontal axis lying in the steel band 13 passing axially through the ring 35. Each winding mechanism 33a, 33b is individually driven by a pinion 39 engaging a rack 41 mounted on the ring 35; the pinion 39 being driven by a suitable power source 43 such as an electric motor. Both winding mechanisms 33a, 33b are mounted on a suitable support 45 such as a floor or on the ground.

Each rotatable ring 35 carries a plurality of outwardly projecting arms 47 on which are mounted individual spools 49 carrying filament reinforcings, such as glass filaments, in the form of rovings 51, 51a.

In front of each winding mechanism 33a, 33b, there are a plurality of conventional guiding eyes 53, 53a respectively, that may be suitably mounted in a fixed location; the guiding eyes being used to guide rovings 55, 55a toward and onto the upper and lower surfaces of the steel band 13, and generally in the longitudinal direction of the band 13.

It is to be understood that conventional breaker bars may be used if preferred instead of the guiding eyes 53, 53a. While in FIG. 1, only one guiding eye 53 is shown above and below the metal band 13 and in front of each winding mechanism 33a, 33b, it is to be understood that a plurality of guiding eyes 53, 53a are arranged in front of each winding mechanism 33a, 33b and above and below the metal band 13; the plurality of guiding eyes being distributed more or less uniformly transversely of the metal band 13. It should be understood also, that the rovings 55, 55a, are carried on and lead from a plurality of fixed spools (not shown) mounted in a convenient location.

Between the end roller 15 and the first winding mechanism 33a, there is a conventional applicator 57 for applying to the lower run 25 of the metal band 13 a conventional parting agent, such as polyvinyl alcohol or polyvinyl chloride.

Likewise, between the second winding mechanism 33b and the Rotocure apparatus 19, there is a conventional resin applicator 59 through which the steel band 13 and the filamentary wound structure formed thereon passes and wherein thermosetting resin is applied to the filamentary structure to thoroughly impregnate the filaments.

In some applications, where convenience in handling the rovings 51, 51a, 55, 55a is a major advantage, the several rovings may be in a prepreg condition prior to application to the metal band. In such situations, the metal band 13 and the prepreg rovings would pass directly into the curing apparatus. In such instances a resin applicator 59 would not be required since the filamentary rovings are already preimpregnated.

FIG. 4 illustrates apparatus 60 that removes cured resin and filamentary material from along the edges of the metal band 13, thus providing separate top and bottom filamentary wound structures 89, 91 respectively. Such apparatus 60 includes vertically arranged grinding rollers 61, 63, each of which is indicative of a plurality of such rollers arranged on each side of the metal band 13. Each such roller 61, 63 has an axial shaft 65 which is journalled in a groove 67 in an upper supporting block 69, and in a groove 71 in a lower supporting block 73. Collars 75, 76 surround the upper and lower shafts 65 respectively, and the collars are preferably resiliently biased by springs 77 acting against fixed vertical supports 79. The lower collars 76 may be secured to the shaft 65 in any suitable manner, and they are driven by a suitable power source, such as a motor M, whereby the rollers 61, 63 rotate about the vertical axis of the shaft 65 in a direction counter to the linear movement of the belt 13.

A pair of spools 81, 83 may be suitably located relative to the apparatus 60 for receiving the finished strip products 89, 91 when they are removed from the metal band 13. Of course, the spools 81, 83 may be located at any convenient location, and the spools 81, 83 are generally power driven for rotation about shafts 85, 87 respectively.

One method of fabricating continuous lengths of filamentary wound flat planar strips will be more fully understood by referring to FIG. 1. The endless metal band 13, moving in the direction of the arrow B, passes continually through the parting agent applicator 57 wherein both the upper and the lower surfaces of the lower run 25 are coated with a suitable parting agent, such as polyvinyl alcohol. Thereafter, the lower run 25 passes between the first set of upper and lower guiding eyes 53, and the first longitudinal filaments 55 are applied to the upper and lower surfaces of the lower run 25, generally in the longitudinal direction of the lower run 25. Thereafter, the first warp layer of filament rovings 51 are helically wound over the longitudinal filaments 55 as the lower run 25 passes through the first winding mechanism 33a; the winding mechanism 33a, being continuously operated to rotate in the direction of the arrow C (FIG. 2) to helically wind the rovings 51 at a selected helix angle over the longitudinally arranged filaments. Then, as the lower run 25 approaches the second winding mechanism 33b, another layer of longitudinally arranged filaments 55a are laid on top of the helical rovings 51 generally in the longitudinal direction of the lower run 25. Thereafter, the formed structure passes through the second winding mechanism 33b which is continuously powered to operate generally in the direction of the arrow D (FIG. 3), which is counter to the direction of rotation C of the winding mechanism 33a. The rovings 51a, applied to the formed structure by the second rotating mechanism 33b, are wound on this structure at a helix angle that is biased with respect to the first helix angle of the first wrapped layer mentioned herein.

In one aspect of the invention, the several longitudinally arranged filaments and the warp filament rovings are applied to the endless metal band 13 in a dry condition; that is to say, the filaments and rovings are not resin-wet when they are applied. In such a situation, a heat curable resin of the thermosetting type is applied to the filaments and rovings as the structure passes through the resin applicator 59 just before the structure enters the resin curing apparatus.

In another aspect of the invention, the longitudinally arranged filaments 55, 55a and the helically wound filament rovings 51, 51a are in a prepreg condition before they are applied to the metal band 13. In this situation, the metal band and formed structure passes directly into the resin curing apparatus; it is not necessary to provide a resin applicator.

The metal band 13 and the filament structure wound thereon is conveniently supported by the idler rollers 21, and the band and structure enter the Rotocure apparatus 19 after passing over supporting rollers 27a, 27b. Within the Rotocure apparatus 19, the band and structure passes close to the heating element 31 which has an arcuate shape substantially concentric with the powered drum 17. When the band and structure leave the Rotocure apparatus 19, the resin is practically cured and the band and structure is guided by rollers 29a, 29b and supported by intermediary rollers 21 as it moves horizontally toward the resin and filament removing apparatus 60. Preferably, the apparatus 60 is located some distance from the exit end of the Rotocure apparatus 19 in order to allow the exothermic heat generated during the resin curing process to dissipate.

As the formed structure and metal band 13 pass between the grinding rollers 61, 63, the resin and filamentary material along the edges of the metal band 13, that serves to connect the top formed sheet structure from the bottom formed sheet structure, is removed.

In FIG. 4, the grinding roller 61 at the left-hand side is in a position at the start of the grinding operation. The grinding roller 61 may move laterally toward the right as it removes the resin and reinforcing filaments from the edges of the band since the shaft 65 is at the left-hand side of the grooves 67, 71. The grinding roller 63 at the right-hand side of FIG. 4 is shown in a position at the finish of the grinding operation; the shaft 65 being in abutting relation with the left side of the grooves 67, 71.

After the metal band and structure passes the grinding apparatus 60 and after the edge material is removed, the top filamentary structure is separated from the bottom filamentary structure, and both formed structures may be readily removed from the metal band 13 since a parting agent had been applied initially to the band 13. The top 89 and bottom 91 filament wound continuous resin sheets may then be wound on the powered spools 81, 83 which rotate in the direction of the arrow E. The metal band 13 may then pass through a cleaning station (not shown), if desired, before it engages the end roller 15 preparatory to passing through the parting agent applicator 57 in a repeating cycle.

A feature of the present invention is that continuous lengths of filament wound resin sheets may now be readily produced. All of the desirable physical properties of filament winding are incorporated therefore in the filament wound sheets produced in accordance with the present invention.

Although the invention has been described herein with a certain degree of particularity, it is understood that the present disclosure has been made only as an example and that various modifications and changes may be made within the scope of the invention as defined by the appended claims.

What is claimed is:

1. Apparatus for producing continuous lengths of filament reinforced flat resin sheets comprising:
   (a) an endless thin flat band;
   (b) spaced apart end rollers over which said band passes, one of said rollers being power driven;
   (c) means for applying a parting agent to the surfaces of said band;
   (d) a plurality of first filaments;
   (e) a plurality of guiding eyes through which said first filaments pass onto opposite surfaces of said band generally in the lengthwise direction thereof;
   (f) winding apparatus surrounding a portion of said band and supporting a plurality of spools thereon holding filamentary reinforcing rovings;
   (g) means for rotating said winding apparatus whereby said rovings are wound helically over the longitudinally arranged filaments on said band;
   (h) means for impregnating said filaments with a heat curable resin;
   (i) apparatus for partially curing said resin;
   (j) means arranged adjacent said band to remove the cured resin and filamentary material from along the edges of said band whereby the top and bottom continuous lengths of filament reinforced sheets are separated; and
   (k) means for removing said separated top and bottom sheets from said band.

2. Apparatus for producing continuous lengths of filament reinforced flat resin sheets comprising:
   (a) an endless thin flat band;
   (b) spaced apart end rollers over which said band passes, one of said rollers being power driven;
   (c) means for applying a parting agent to the surfaces of said band;
   (d) a plurality of first filaments in a prepreg condition;
   (e) a plurality of guiding eyes through which said filaments pass onto opposite surfaces of said band generally in the lengthwise direction thereof;
   (f) winding apparatus surrounding a portion of said band supporting a plurality of spools holding filamentary reinforcing rovings in a prepreg condition;
   (g) first means for rotating said winding apparatus whereby said rovings are wound helically over the longitudinally arranged filaments on said band;
   (h) apparatus for partially curing the resin in said prepreg filamentary materials;
   (i) second means arranged adjacent said band for removing the cured resin and filamentary material from along the edges of said band whereby the top and bottom continuous lengths of filament reinforced sheets are separated; and
   (j) third means for removing said separated top and bottom sheets from said band.

3. The apparatus of claim 2 wherein:
   (a) said second means comprises vertically arranged powered grinding rollers.

References Cited

UNITED STATES PATENTS

| 2,723,705 | 11/1955 | Collins | 156—177 |
| 2,954,817 | 10/1960 | Havemann | 156—552 |
| 3,379,596 | 4/1968 | Stutz | 156—434 |

SAMUEL FEINBERG, Primary Examiner

U.S. Cl. X.R.

264—174